US012756972B2

(12) United States Patent
Takahashi

(10) Patent No.: US 12,756,972 B2
(45) Date of Patent: Oct. 6, 2026

(54) COMMUNICATION CONTROL DEVICE AND ONBOARD DEVICE

(71) Applicant: JVCKENWOOD Corporation, Yokohama (JP)

(72) Inventor: Yasuki Takahashi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 183 days.

(21) Appl. No.: 18/664,356

(22) Filed: May 15, 2024

(65) Prior Publication Data

US 2024/0298109 A1 Sep. 5, 2024

Related U.S. Application Data

(63) Continuation of application No. PCT/JP2022/030956, filed on Aug. 16, 2022.

(30) Foreign Application Priority Data

Nov. 16, 2021 (JP) ................................ 2021-186347

(51) Int. Cl.
*H04R 1/32* (2006.01)
*B60R 11/02* (2006.01)
(Continued)

(52) U.S. Cl.
CPC ........ *H04R 1/326* (2013.01); *H04M 1/72463* (2021.01)

(58) Field of Classification Search
None
See application file for complete search history.

(56) References Cited

U.S. PATENT DOCUMENTS

2009/0253408 A1* 10/2009 Fitzgerald ......... H04M 1/72457 455/414.1
2011/0092159 A1* 4/2011 Park ...................... H04L 63/102 455/41.2

(Continued)

FOREIGN PATENT DOCUMENTS

DE 102019213816 A1 * 3/2021 ........... H04R 29/004
JP 2017-225184 12/2017

OTHER PUBLICATIONS

International Search Report and Written Opinion for International Application Serial No. PCT/JP2022/030956 mailed on Nov. 8, 2022, 8 pages.

*Primary Examiner* — Qin Zhu
(74) *Attorney, Agent, or Firm* — Amin, Turocy & Watson, LLP

(57) ABSTRACT

A communication control device includes: a sound acquisition unit configured to acquire surrounding sounds including at least a specific sound and picked up by a sound pickup unit upon output of the specific sound from a sound output unit; a comparison unit configured to make an analysis of and a comparison between acoustic features of reference surrounding sounds that are surrounding sounds picked up by the sound pickup unit upon output of the specific sound from the sound output unit at a time of initial setting and acoustic features of the surrounding sounds acquired by the sound acquisition unit at a time other than the time of initial setting; and a communication control configured to control the state of a wireless communication according to a result of the comparison by the comparison unit.

5 Claims, 4 Drawing Sheets

(51) Int. Cl.

| | |
|---|---|
| ***H04M 1/00*** | (2006.01) |
| ***H04M 1/72463*** | (2021.01) |
| ***H04R 3/00*** | (2006.01) |
| ***H04W 4/48*** | (2018.01) |
| ***H04W 12/65*** | (2021.01) |

(56) References Cited

U.S. PATENT DOCUMENTS

| | | | | |
|---|---|---|---|---|
| 2012/0071151 | A1* | 3/2012 | Abramson | H04M 1/72463 455/418 |
| 2016/0094948 | A1 | 3/2016 | Kodan et al. | |
| 2017/0366935 | A1* | 12/2017 | Ahmadzadeh | H04M 1/72457 |
| 2018/0091945 | A1 | 3/2018 | Kodan et al. | |
| 2018/0097923 | A1* | 4/2018 | Pandurangarao | H04L 43/16 |
| 2020/0314390 | A1* | 10/2020 | Schimelpfenig | H04N 5/76 |
| 2022/0208208 | A1* | 6/2022 | Heo | G10L 15/28 |

* cited by examiner

COMMUNICATION CONTROL DEVICE AND ONBOARD DEVICE

CROSS-REFERENCE TO RELATED APPLICATIONS

This application is a Continuation of PCT International Application No. PCT/JP2022/030956 filed on Aug. 16, 2022 which claims the benefit of priority from Japanese Patent Application No. 2021-186347 filed on Nov. 16, 2021, the entire contents of which are incorporated herein by reference.

BACKGROUND

The present invention relates to communication control devices and onboard devices.

A technique has been known for monitoring and controlling whether or not a wireless communication device, which is able to be arranged in a moving vehicle, has been taken out of the moving vehicle and is being used by a user (see, for example, Japanese Unexamined Patent Application Publication No. 2017-225184).

Onboard devices having a communication function using a communication network, such as the Internet or a cell phone line, are in widespread use. A portable information terminal brought into a vehicle by a passenger is able to use a communication network via an onboard device inside the vehicle. An onboard device is supposed to be used by being installed in a specific vehicle and if the onboard device is taken out of that vehicle, use of a communication function that the onboard device has is to be restricted.

SUMMARY

A communication control device according to one aspect of the present disclosure includes: a sound acquisition unit configured to acquire surrounding sounds including at least a specific sound and picked up by a sound pickup unit upon output of the specific sound from a sound output unit; a comparison unit configured to make an analysis of and a comparison between acoustic features of reference surrounding sounds that are surrounding sounds picked up by the sound pickup unit upon output of the specific sound from the sound output unit at a time of initial setting and acoustic features of the surrounding sounds acquired by the sound acquisition unit at a time other than the time of initial setting; and a communication control configured to, when determining that there is no difference between the reference surrounding sounds and the acquired surrounding sounds from a result of the comparison by the comparison unit, bring communication to and from an external device by wide area wireless communication or communication to and from a portable information terminal by short range wireless communication into a first state, and when determining that there is a difference between the reference surrounding sounds and the surrounding sounds from the result of the comparison by the comparison unit, bring the communication to and from the external device by the wide area wireless communication or the communication to and from the portable information terminal by the short range wireless communication into a second state more restricted than the first state.

An onboard device according to another aspect of the present disclosure includes: the above-described communication control device; and a sound pickup unit that picks up sound. The sound pickup unit is installed to face a direction where there are few factors that change acoustic features until an echo of a sound output from the sound output unit is picked up by the sound pickup unit.

DETAILED DESCRIPTION

Embodiments of a communication control device and an onboard device, according to the present disclosure will hereinafter be described in detail by reference to the appended drawings. The present invention is not to be limited by the following embodiments.

First Embodiment

Onboard Device

Figure 1:
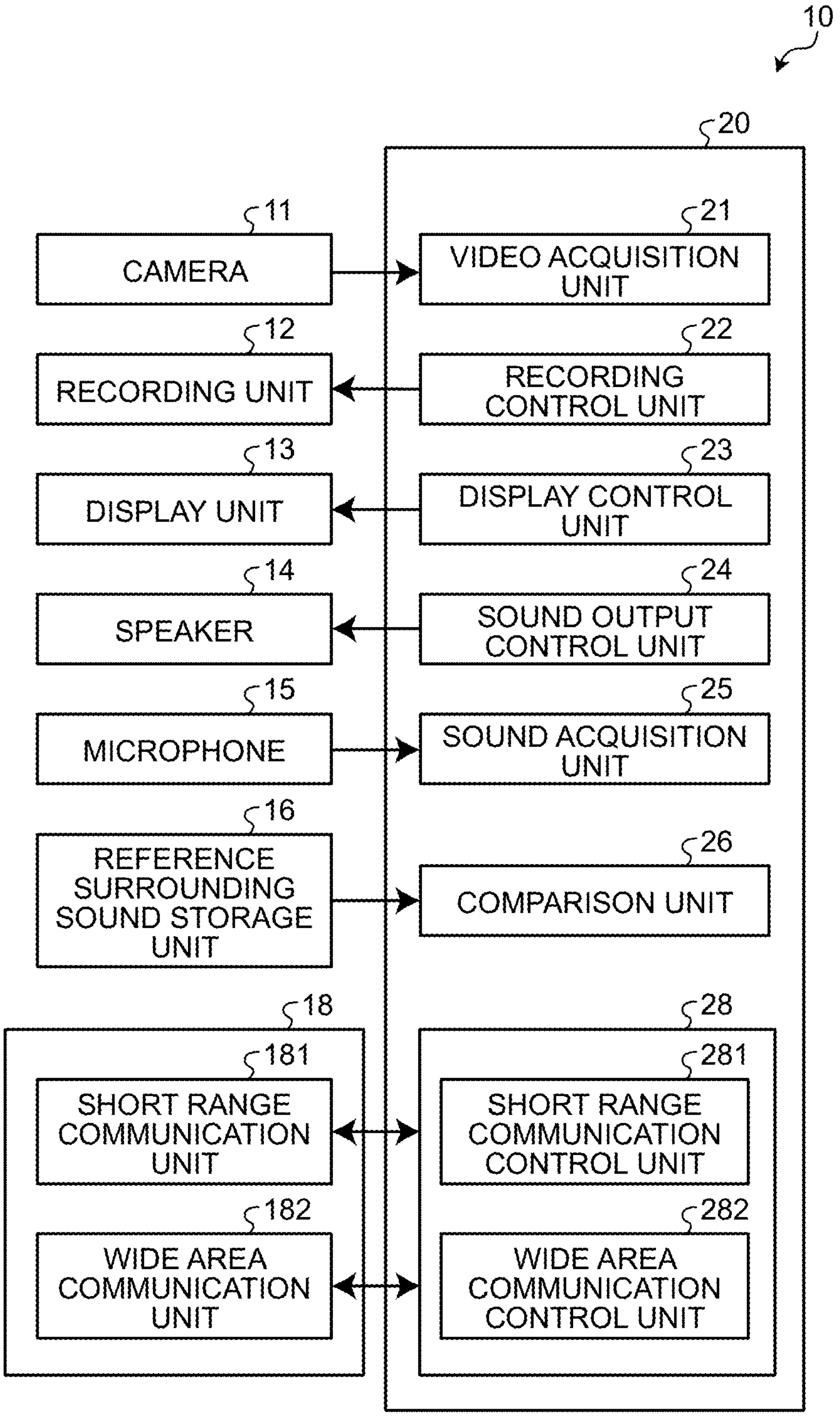
FIG. 1 is a block diagram illustrating an example of a configuration of an onboard device having a communication control device, according to a first embodiment.

FIG. 1 is a block diagram illustrating an example of a configuration of an onboard device 10 having a control unit 20, according to a first embodiment. The onboard device 10 is a device having a communication function using a communication network, such as the Internet or a cell phone line. The onboard device 10 is portable, brought into and used in a vehicle, and is for example, a drive recorder, a navigation device, or a wireless communication device for vehicles. For example, the onboard device 10 may be mounted as a drive recorder, a navigation device, and a portable communication device that have been installed in a vehicle beforehand. The onboard device 10 may be, for example, mounted as a communication device installed in a vehicle beforehand and not having functions of a drive recorder and a navigation device. With respect to this embodiment, the onboard device 10 will be described as a drive recorder that is portable and brought into and used in a vehicle.

In this embodiment, the onboard device 10 is mounted on an upper portion of a windshield and in back of a rearview mirror. The onboard device 10 has a camera 11, a recording unit 12, a display unit 13, a speaker (sound output unit) 14, a microphone (sound pickup unit) 15, a reference surrounding sound storage unit 16, a communication unit 18 including a short range communication unit 181 and a wide area communication unit 182, and a control unit (communication control device) 20. In a case where the onboard device 10 has been installed in a vehicle, communication to and from an external device by wide area wireless communication or communication to and from a portable information terminal by short range wireless communication is set into a first state, and in a case where the onboard device 10 has not been installed in the vehicle, the communication to and from the external device by the wide area wireless communication or the communication to and from the portable information terminal by the short range wireless communication is set into a second state more restricted than the first state.

The first state is a state where communication is enabled. The second state is at least one of a state where communication is disabled, a state where a usable time period is restricted, or a state where a communication volume is restricted. In this embodiment, the second state is the state where communication is disabled.

In a case described with respect to this embodiment, if the onboard device 10 has been installed in a vehicle, communication via the wide area communication unit 182 by a portable information terminal connected to the onboard device 10 by the short range communication unit 181 is allowed, and if the onboard device 10 has not been installed in the vehicle, the communication is disallowed.

The portable information terminal is an information terminal having a communication function, for example, a smartphone, a tablet personal computer, a notebook personal computer, or a portable gaming console, which is used by a passenger.

The camera 11 is a camera to capture an image of surroundings of the vehicle. The camera 11 is installed in the vehicle and captures an image forward and an image backward as the vehicle travels along. In this embodiment, the camera 11 is arranged forward and backward in the vehicle. The camera 11 is a far-infrared ray camera, a visible light camera, or a combination of a far-infrared ray camera and a visible light camera. The camera 11 is arranged, for example, at a position where an image forward or backward in a direction of travel is able to be captured. The camera 11 constantly shoots a video from a start to a stop of an engine, that is, while the vehicle is operating. The camera 11 outputs the video shot, to a video acquisition unit 21 of the control unit 20. The video is, for example, a moving image including, for example, images of 30 frames per second.

The recording unit 12 is used for, for example, temporary storage of data in the onboard device 10. The recording unit 12 is, for example, a semiconductor memory element, such as a random access memory (RAM) or a flash memory, or a recording unit, such as a memory card. The recording unit 12 may instead be an external recording unit wirelessly connected via a communication device not illustrated in the drawings. The recording unit 12 records therein loop recording data described later, on the basis of a control signal output from a recording control unit 22 of the control unit 20.

The display unit 13 is, for example, a display device specific to the onboard device 10 or a display device shared with another system that may be a navigation system. The display unit 13 is, for example, a display, such as a liquid crystal display (LCD) or an organic electro-luminescence (EL) display. The display unit 13 displays a video on the basis of a video signal output from a display control unit 23 of the control unit 20. The display unit 13 displays a video being shot by the camera 11 or a video recorded in the recording unit 12. The display unit 13 may display whether communication is in the first state or the second state. In this embodiment, the display unit 13 may display whether communication by the wide area communication unit 182 is in an allowed state or a disallowed state.

The speaker 14 is a device that outputs various sounds. A plurality of the speakers 14 may be installed. On the basis of a sound signal output from a sound output control unit 24 of the control unit 20, the speaker 14 outputs a sound. For example, the speaker 14 outputs sounds corresponding to a video displayed on the display unit 13. In this embodiment, the speaker 14 outputs, for example, a specific sound at: a time of initial setting that is at a time of a first start-up of the onboard device 10 since installation of the onboard device 10 in a specific vehicle; and a time of a second or later start-up of the onboard device 10.

The initial setting may be performed at the time of the first start-up of the onboard device 10 and additionally at any time, for example, when acoustic features in the vehicle have a possibility of changing, like when a layout of seats in the vehicle has been changed.

The specific sound is, for example, a start-up sound of the onboard device 10. The specific sound is preferably a sound over a short time period of about a few seconds. The specific sound is, for example, a message indicating a start-up, a chime, or a buzzer. Internal sounds, such as a speaking voice of a passenger, a sound output from an audio device, and a sound of an air conditioner, and external sounds of other vehicles, railroad crossings, rains, and winds, for example, have an influence on the acoustic features in the vehicle. Therefore, the specific sound may be a sound having an acoustic pressure, a phase, and a frequency that have been adjusted to reduce this influence. The specific sound may be a continuous or intermittent sound.

The microphone 15 is a microphone that picks up audible sound generated in the vehicle. A plurality of the microphones 15 may be installed. The microphone 15 picks up sounds corresponding to a video shot by the camera 11, for example. In this embodiment, when a specific sound is output from the speaker 14, for example, the microphone 15 picks up surrounding sounds that are sounds in the vehicle, the sounds including: the specific sound that has been output from the speaker 14 and is directly audible at a position of the microphone 15 without being reflected, and reflected sounds that are reflections of the specific sound at objects, such as a windshield and interior trims in the vehicle. The surrounding sounds picked up by the microphone 15 include at least the specific sound that is directly audible at the position of the microphone without being reflected. The surrounding sounds picked up by the microphone include, for example, traveling sounds of the vehicle that are audible in the vehicle, such as an engine sound, a muffled sound, a road surface sound, and a wind sound. The microphone 15 outputs sounds that the microphone 15 has picked up, to a sound acquisition unit 25 of the control unit 20, for example. Sounds picked up by the microphone 15 at the time of initial setting will be referred to as reference surrounding sounds.

For example, in a case where the onboard device 10 has been taken out of the vehicle and is being used outside the vehicle, the microphone 15 picks up surrounding sounds including: a specific sound that has been output from the speaker 14 and is directly audible at the position of the microphone 15 without being reflected; and any reflected sound that is a reflection of the specific sound at any object that is present around the microphone 15. In a case where the onboard device 10 has been taken out of the vehicle and is being used in a large space with no objects surrounding the onboard device 10, the microphone 15 picks up surrounding sounds including a specific sound that has been output from the speaker 14 and is directly audible at the position of the microphone without being reflected.

Sounds in the vehicle are generated by sound absorption and reflection of a sound output from the speaker 14, for example, by objects present around the speaker 14. Sounds in a vehicle depend on objects specific to the vehicle, for example, a depth, a height, a width, and a shape of the vehicle, materials that influence sound absorption and reflectivity, and layouts of seats and interior trims. Therefore, acoustic features inside the same vehicle are approximately constant. However, acoustic features inside a vehicle are sometimes influenced by objects that have a possibility of changing, for example, passengers, luggage, doors, and windows, and are not necessarily always constant. Therefore, upon pickup of sounds, the speaker 14 and the microphone 15 may be arranged to face in a predetermined direction to reduce influence of any change in acoustic features due to an object that has a possibility of changing.

The predetermined direction is a direction where there are a small number of or no objects that have a possibility of changing every time sounds are picked up in a space between the speaker 14 and the microphone 15 when echoes of sounds output from the speaker 14 are picked up by the microphone 15. The predetermined direction is a direction toward the windshield from the position where the onboard device 10 has been mounted, or in other words, a direction toward the windshield from the back of the rearview mirror.

In a case where a plurality of the speakers 14 are installed, for example, one is arranged to face a passenger and one is arranged to face the windshield at the front of the vehicle. In a case where a plurality of the microphones 15 are installed, for example, one is arranged to face a passenger and one is arranged to face the windshield at the front of the vehicle. The speaker 14 arranged to face the windshield outputs a specific sound at the time of initial setting of the onboard device 10 and at the time of a second or later start-up of the onboard device 10. The microphone 15 arranged to face the windshield picks up surrounding sounds at the time of initial setting and at the time of a second or later start-up. Output of the specific sound from the speaker 14 arranged to face the windshield and pickup of sounds by the microphone 15 arranged to face the windshield reduce influence of any change in the acoustic features due to any object that has a possibility of changing and enable obtainment of the acoustic features specific to the vehicle.

The speaker 14 and the microphone 15 may be integrated together, or may be wired or wireless and separated from each other. A microphone and a speaker of an ordinary drive recorder may be used as the speaker 14 and the microphone 15.

The reference surrounding sound storage unit 16 is a storage device that stores the reference surrounding sounds at the time of initial setting. The reference surrounding sound storage unit 16 is a semiconductor memory element, such as a hard disk, a solid state drive (SSD), or a flash memory, or a recording unit, such as a memory card. The reference surrounding sound storage unit 16 may instead be an external recording unit wirelessly connected via a communication device not illustrated in the drawings.

The reference surrounding sounds are surrounding sounds picked up by the microphone 15 when a specific sound is output from the speaker 14 at the time of initial setting of the onboard device 10. The reference surrounding sounds are stored at the time of initial setting, for example. The reference surrounding sounds are picked up in a state where a layout inside the vehicle has been made the same as that at a time of usual use of the vehicle. The reference surrounding sounds may be updated, for example, when the layout of the seats in the vehicle has been changed. The reference surrounding sounds are sounds inside the vehicle and picked up at the usual installation position of the onboard device 10.

The reference surrounding sound storage unit 16 may store acoustic features resulting from analysis of the reference surrounding sounds.

The communication unit 18 performs short range wireless communication or wide area wireless communication. In this embodiment, the communication unit 18 includes the short range communication unit 181 and the wide area communication unit 182.

The short range communication unit 181 is a communication unit that performs short range wireless communication. The short range communication unit 181 performs communication of information to and from a portable information terminal not illustrated in the drawings. The short range communication unit 181 includes a communication module of, for example, WiFi (registered trademark) and provides wide area wireless communication to the portable information terminal via the wide area communication unit 182. In other words, the short range communication unit 181 and the wide area communication unit 182 function as a wireless local area network (LAN) router for the portable information terminal. The short range communication unit 181 is paired with a communication unit of the portable information terminal beforehand and is used in a state where the short range communication unit 181 and the communication unit of the portable information terminal are able to communicate with each other.

The wide area communication unit 182 is a communication unit that performs wide area wireless communication. The wide area communication unit 182 may perform communication by any method, such as the Internet or a cell phone line. The communication by the wide area communication unit 182 is controlled by a wide area communication control unit 282 of the control unit 20. The wide area communication unit 182 provides wide area wireless communication to the portable information terminal connected to the onboard device 10 via the short range communication unit 181.

Communication Control Device

The control unit 20 is an arithmetic processing device (control device) including, for example, a central processing unit (CPU). The control unit 20 loads a stored program into a memory and executes commands included in the program. The control unit 20 includes an internal memory that is not illustrated in the drawings and that is used for temporary storage of data at the control unit 20. Therefore, the control unit 20 causes a communication control method to be executed by the onboard device 10. The control unit 20 is also a computer that causes a program according to the present disclosure to operate. In a case where the control unit 20 has been installed in the vehicle, communication to and from an external device by wide area wireless communication or communication to and from the portable information terminal by short range wireless communication is set into the first state, and in a case where the control unit 20 has not been installed in the vehicle, the communication to and from the external device by the wide area wireless communication or the communication to and from the portable information terminal by the short range wireless communication is set into the second state more restricted than the first state. In this embodiment, in a case where the onboard device 10 has been installed in the vehicle, the control unit 20 enables communication via the wide area communication unit 182 by the portable information terminal connected by the short range communication unit 181 and disables the communication in a case where the onboard device 10 has not been installed in the vehicle. The control unit 20 has the video acquisition unit 21, the recording control unit 22, the display control unit 23, the sound output control unit 24, the sound acquisition unit 25, a comparison unit 26, and the communication control unit 28 including a short range communication control unit 281 and the wide area communication control unit 282.

The video acquisition unit 21 acquires a video having, shot therein, surroundings of the vehicle. The video acquisition unit 21 acquires a video output by the camera 11. The video acquisition unit 21 temporarily records a video acquired by the video acquisition unit 21 and corresponding to a predetermined time period, into an internal memory included in the control unit 20 while updating the video.

The recording control unit 22 performs control of causing the recording unit 12 to record therein a video. More particularly, the recording control unit 22 converts a video temporarily stored in a buffer memory not illustrated in the drawings into any file format, such as, for example, the MP4 format, by encoding the video using a codec of any format. The recording control unit 22 generates a video in a file corresponding to a predetermined time period, from the video temporarily stored in the buffer memory. In a specific example, the recording control unit 22 generates files each corresponding to a video of 60 seconds in the order of recording, from the video temporarily stored in the buffer memory. The time period of the video generated as a file is not necessarily 60 seconds mentioned above as an example. The recording control unit 22 records videos formed into files, into the recording unit 12 in a rewritable manner over a time period of execution of a loop recording process, like while an accessory power source of the vehicle is on. During the time period of execution of the loop recording process, the recording control unit 22 continues to record any generated video into the recording unit 12. When the recording unit 12 has no more space, the recording control unit 22 records loop recording data into the recording unit 12 by overwriting the oldest video with a new video.

The display control unit 23 controls display of a video on the display unit 13. The display control unit 23 outputs a video signal that causes a video to be output by the display unit 13. More particularly, the display control unit 23 causes the display unit 13 to display a video being shot by the camera 11.

The sound output control unit 24 controls output of sounds from the speaker 14. The sound output control unit 24 outputs a sound signal that causes the speaker 14 to output a sound. More particularly, the sound output control unit 24 causes the speaker 14 to output a start-up sound at the time of initial setting.

The sound acquisition unit 25 acquires sounds picked up by the microphone 15. The sound acquisition unit 25 acquires surrounding sounds picked up by the microphone 15 upon output of a specific sound from the speaker 14. More particularly, when a specific sound is output from the speaker 14 at the time of initial setting of the onboard device 10, the sound acquisition unit 25 acquires the reference surrounding sounds picked up by the microphone 15. The sound acquisition unit 25 acquires surrounding sounds picked up by the microphone 15 when a specific sound is output from the speaker 14 at the time of a second or later start-up of the onboard device 10.

The comparison unit 26 makes an analysis of and a comparison between acoustic features of the reference surrounding sounds and acoustic features of the surrounding sounds picked up at the time of the second or later start-up of the onboard device 10. The comparison unit 26 makes a comparison between the reference surrounding sounds and the surrounding sounds, for, for example, at least one selected from a group including: acoustic pressure frequency characteristics; phase frequency characteristics; amplitude frequency characteristics; and frequency characteristics obtained from impulse responses. A method of analyzing the acoustic features is not limited and any publicly known method may be used.

The interior of a room is an enclosed space, a sound output from a sound source is absorbed or reflected by the floor, walls, and ceiling in the room, and sounds specific to the interior of the room are generated. Therefore, indoor acoustic features differ from room to room. Accordingly, outputting a specific sound from the speaker 14 and making a comparison between surrounding sounds picked up by the microphone 15 enable a determination of whether the onboard device 10 is being used in a specific vehicle or being used outside the vehicle.

The comparison unit 26 makes an analysis of and a comparison between: the acoustic features of the reference surrounding sounds that are the surrounding sounds picked up by the microphone 15 when the specific sound is output by the speaker 14 at the time of initial setting; and the acoustic features of the surrounding sounds acquired by the sound acquisition unit 25. The comparison unit 26 makes a comparison between the acoustic features of the reference surrounding sounds and acoustic features of surrounding sounds picked up at the time of a second or later start-up. Upon the comparison between the acoustic features of the reference surrounding sounds and the acoustic features of the surrounding sounds picked up at the time of the second or later start-up, if a difference of a predetermined level or higher is detected, the comparison unit 26 determines that the installation position of the onboard device 10 is different from a usual position, and if the difference of the determined level or higher is not detected, the comparison unit 26 determines that the installation position of the onboard device 10 is the same as the usual position. The installation position of the onboard device 10 being the same as the usual position means, for example, that the onboard device 10 is being used in the same vehicle. The installation position of the onboard device 10 being different from the usual position means, for example, that the onboard device 10 has been taken out of the vehicle and is being used outside the vehicle.

The comparison unit 26 may additionally take influence into consideration, the influence being on the acoustic features dependent on information on states of use of the audio device and air conditioning and states of opening or shutting of the doors and windows in the vehicle.

The communication control unit 28 controls the short range communication unit 181 or the wide area communication unit 182. More particularly, when it is determined that there is no difference between the reference surrounding sounds and the surrounding sounds as a result of the comparison by the comparison unit 26, the communication control unit 28 brings communication to and from an external device by wide area wireless communication or communication to and from a portable information terminal by short range wireless communication into the first state. When it is determined that there is a difference between the reference surrounding sounds and the surrounding sounds, the communication control unit 28 brings the communication to and from the external device by the wide area wireless communication or the communication to and from the portable information terminal by the short range wireless communication into the second state. The communication control unit 28 includes the short range communication control unit 281 and the wide area communication control unit 282.

The short range communication control unit 281 controls the short range communication unit 181 to control short range communication to and from a portable information terminal. More particularly, the short range communication control unit 281 performs pairing with a communication unit of a portable information terminal positioned in a predetermined range from the short range communication unit 181 and performs control to enable communication between the short range communication unit 181 and the communication unit.

On the basis of a result of the comparison by the comparison unit 26, the wide area communication control unit 282 controls the wide area communication unit 182 to control wide area wireless communication via a communication network. More particularly, in a case where it has been determined that there is no difference between the reference surrounding sounds and the surrounding sounds from the result of the comparison by the comparison unit 26, the wide area communication control unit 282 brings communication between the portable information terminal and an external device via the wide area communication unit 182 into the first state and in a case where it has been determined that there is a difference between the reference surrounding sounds and the surrounding sounds, the wide area communication control unit 282 brings the communication between the portable information terminal and the external device via the wide area communication unit 182 into the second state. In this embodiment, when it is determined that there is no difference between the reference surrounding sounds and the surrounding sounds from the result of the comparison by the comparison unit 26, the wide area communication control unit 282 enables the communication between the portable information terminal and the external device via the wide area communication unit 182, and when it is determined that there is a difference between the reference surrounding sounds and the surrounding sounds, the wide area communication control unit 282 disables the communication between the portable information terminal and the external device via the wide area communication unit 182.

There being no difference between the reference surrounding sounds and the surrounding sounds does not necessarily mean that the reference surrounding sounds and the surrounding sounds are exactly the same and includes a case where the difference is less than the predetermined level.

When the installation position of the onboard device 10 is determined to be different from the usual position by the comparison unit 26, the wide area communication control unit 282 performs control to restrict or stop a wireless communication function of the wireless LAN router. When the installation position of the onboard device 10 is determined to be the same as the usual position by the comparison unit 26, the wide area communication control unit 282 performs control to enable use of the wireless communication function of the wireless LAN router.

Processing by Control Unit

Figure 2:
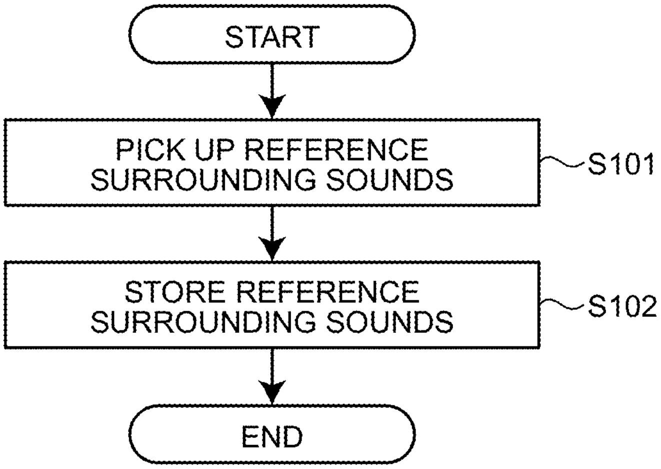
FIG. 2 is a flowchart illustrating a flow of an initial setting process at the communication control device, according to the first embodiment.

A flow of processing by the control unit 20 will be described next by use of FIG. 2 and FIG. 3. FIG. 2 is a flowchart illustrating a flow of an initial setting process at the control unit 20 according to the first embodiment. The initial setting process will be described first by use of FIG. 2. According to the following description, the specific sound is the start-up sound of the onboard device 10. The initial setting process is started at the time of the first start-up of the onboard device 10 after installation of the onboard device 10 in the vehicle, or at any time through a manipulation by a passenger.

The control unit 20 picks up surrounding sounds for the start-up sound (Step S101). When the start-up sound is output from the speaker 14 at the time of initial setting of the onboard device 10, the control unit 20 acquires, by means of the sound acquisition unit 25, the reference surrounding sounds picked up by the microphone 15. The control unit 20 then proceeds to Step S102.

The control unit 20 stores the reference surrounding sounds (Step S102). More particularly, the control unit 20 stores the reference surrounding sounds into the reference surrounding sound storage unit 16.

Figure 3:
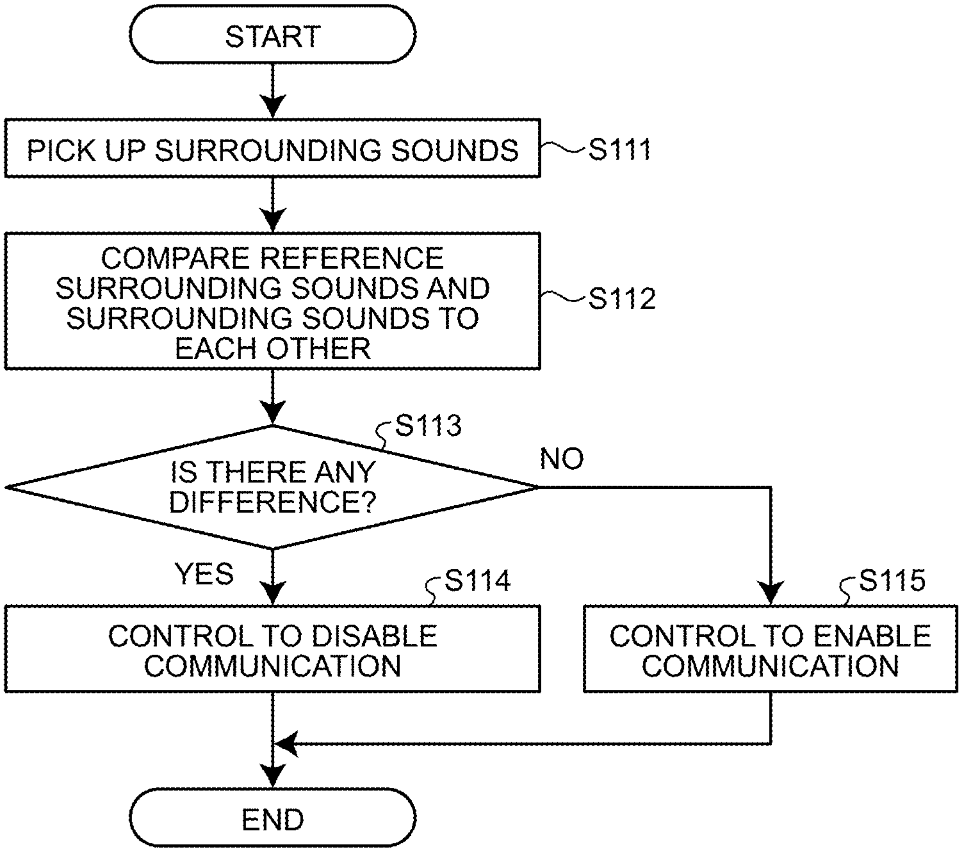
FIG. 3 is a flowchart illustrating a flow of a process at the communication control device, according to the first embodiment.

FIG. 3 is a flowchart illustrating a flow of a process at the control unit 20 according to the first embodiment. A process at the time of a second or later start-up will be described next by use of FIG. 3.

In response to a start-up of the onboard device 10, the process in the flowchart illustrated in FIG. 3 is started. The process in FIG. 3 is started under any condition at the time of a second or a later start-up of the onboard device 10. For example, the process is started when the vehicle becomes available for use, like when the engine of the vehicle having the onboard device 10 installed therein is started, or when operation of the onboard device 10 is started through a manipulation by the driver.

The control unit 20 picks up surrounding sounds (Step S111). More particularly, the control unit 20 acquires, by means of the sound acquisition unit 25, surrounding sounds picked up by the microphone 15 when the start-up sound is output from the speaker 14 upon a start-up of the onboard device 10. The control unit 20 then proceeds to Step S112.

The control unit 20 makes a comparison between the reference surrounding sounds and the surrounding sounds (Step S112). More particularly, by means of the comparison unit 26, the control unit 20 makes an analysis of and a comparison between acoustic features of the reference surrounding sounds and acoustic features of the surrounding sounds picked up at the time of the second or later start-up of the onboard device 10. The control unit 20 then proceeds to Step S113.

The control unit 20 determines whether or not there is a difference between the reference surrounding sounds and the surrounding sounds (Step S113). More particularly, in a case where the comparison unit 26 makes a comparison between the acoustic features of the reference surrounding sounds and the acoustic features of the surrounding sounds picked up at the time of the second or later start-up and detects a difference of the predetermined level or higher, the control unit 20 determines that the installation position of the onboard device 10 is different from the usual position and determines that there is a difference between the reference surrounding sounds and the surrounding sounds. In a case where no difference of the predetermined level or higher is detected, the control unit 20 determines that the installation position of the onboard device 10 is the same as the usual position and determines that there is no difference between the reference surrounding sounds and the surrounding sounds. In a case where the control unit 20 has determined, by means of the comparison unit 26, that there is a difference between the reference surrounding sounds and the surrounding sounds (Yes at Step S113), the control unit 20 proceeds to Step S114. In a case where the control unit 20 has determined, by means of the comparison unit 26, that there is no difference between the reference surrounding sounds and the surrounding sounds (No at Step S113), the control unit 20 proceeds to Step S115.

In a case where the control unit 20 has determined that there is a difference between the reference surrounding sounds and the surrounding sounds (Yes at Step S113), the control unit 20 performs control to disable communication (Step S114). More particularly, the control unit 20 disables, by means of the wide area communication control unit 282, communication to and from an external device by the wide area communication unit 182. In other words, the control unit 20 performs control, by means of the wide area communication control unit 282, to restrict or stop the wireless communication function of the wireless LAN router. In a state where the onboard device 10 has been taken out of the vehicle, for example, the wireless communication function of the wireless LAN router is thereby restricted or stopped.

In a case where the control unit 20 has determined that there is no difference between the reference surrounding sounds and the surrounding sounds (No at Step S113), the control unit 20 performs control to enable communication (Step S115). More particularly, the control unit 20 enables, by means of the wide area communication control unit 282, the communication to and from the external device by the wide area communication unit 182. In other words, the control unit 20 performs control, by means of the wide area communication control unit 282, to start the wireless communication function of the wireless LAN router. In a case where the onboard device 10 has been brought into the vehicle, for example, use of the wireless communication function of the wireless LAN router is thereby enabled. A passenger performs wide area wireless communication using a portable information terminal brought into the vehicle, via the onboard device 10.

Effects

As described above, in this embodiment, when it is determined that there is no difference between the reference surrounding sounds and the surrounding sounds, the communication between the portable information terminal and the external device via the wide area communication unit 182 for wide area wireless communication is enabled, and when it is determined that there is a difference between the reference surrounding sounds and the surrounding sounds, the communication between the portable information terminal and the external device via the wide area communication unit 182 is disabled. This embodiment enables prevention of use of the communication network for wide area wireless communication via the onboard device 10 by the portable information terminal in the case where the onboard device 10 has been taken out of the vehicle. This embodiment thus enables adequate control of a communication function of an onboard device.

In this embodiment, the microphone 15 is installed to face in the direction where there are few factors that change the acoustic features when a sound output from the speaker 14 is reflected by objects specific to the vehicle and picked up by the microphone 15. Furthermore, in this embodiment, the speaker 14 is installed to face in the direction where there are few factors that change the acoustic features when the sound output from the speaker 14 is reflected by the objects specific to the vehicle and picked up by the microphone 15. Such arrangement of the microphone 15 and the speaker 14 according to the embodiment enables reduction of the influence of the change in the acoustic features dependent on, for example, the layout of the seats and the position of the passenger that have a possibility of changing.

Second Embodiment

Figure 4:
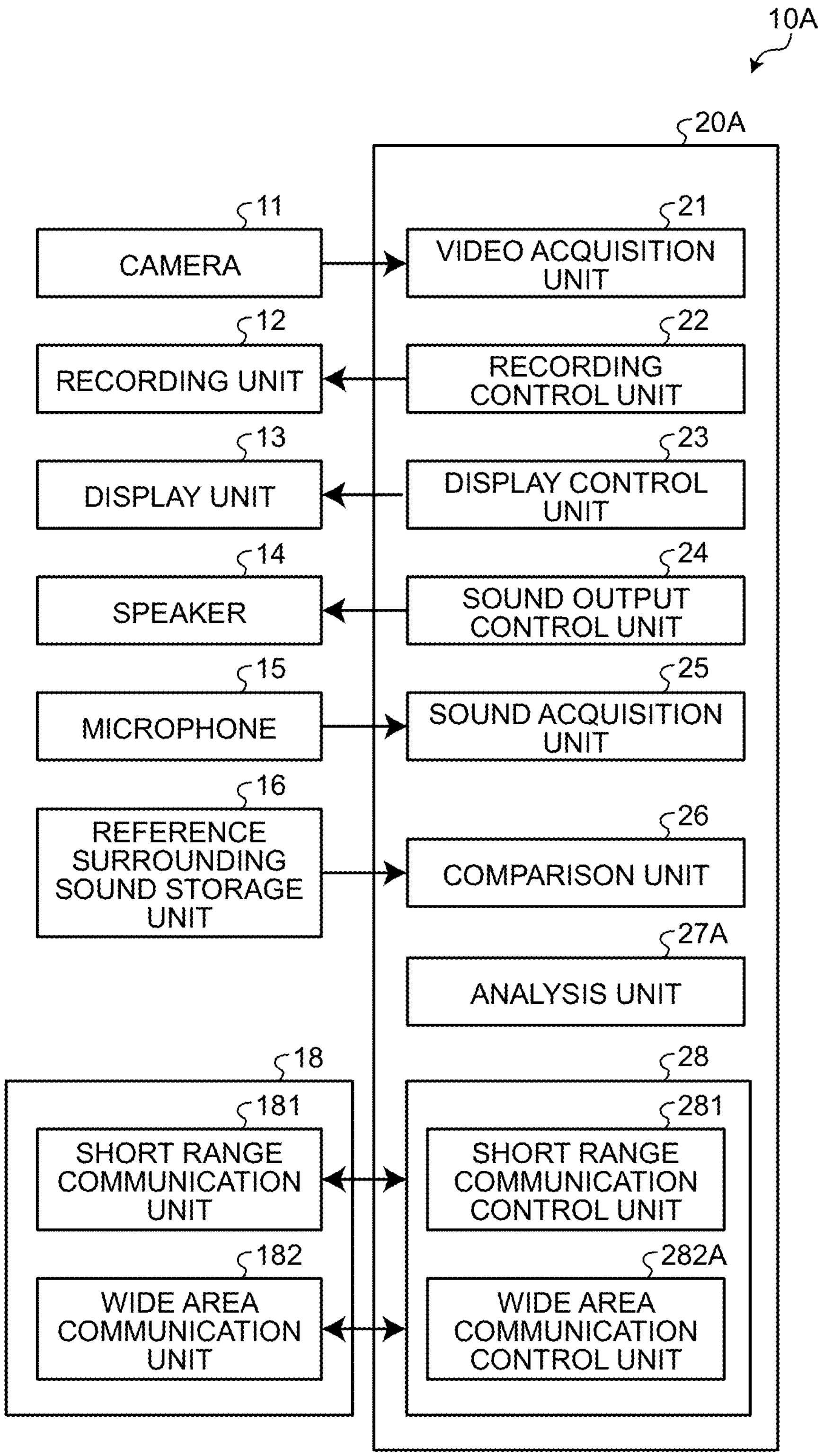
FIG. 4 is a block diagram illustrating an example of a configuration of an onboard device having a communication control device, according to a second embodiment.
Figure 5:
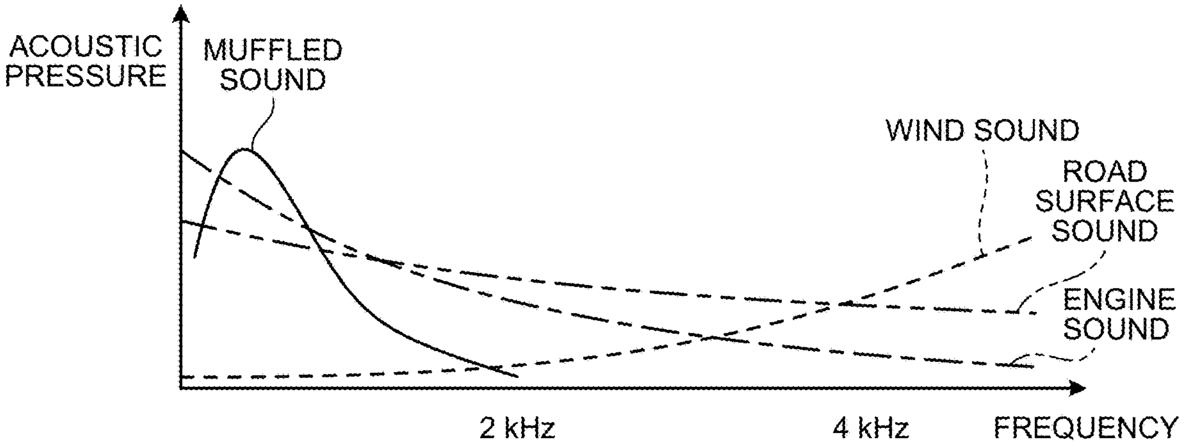
FIG. 5 is a diagram illustrating an example of traveling sounds.
Figure 6:
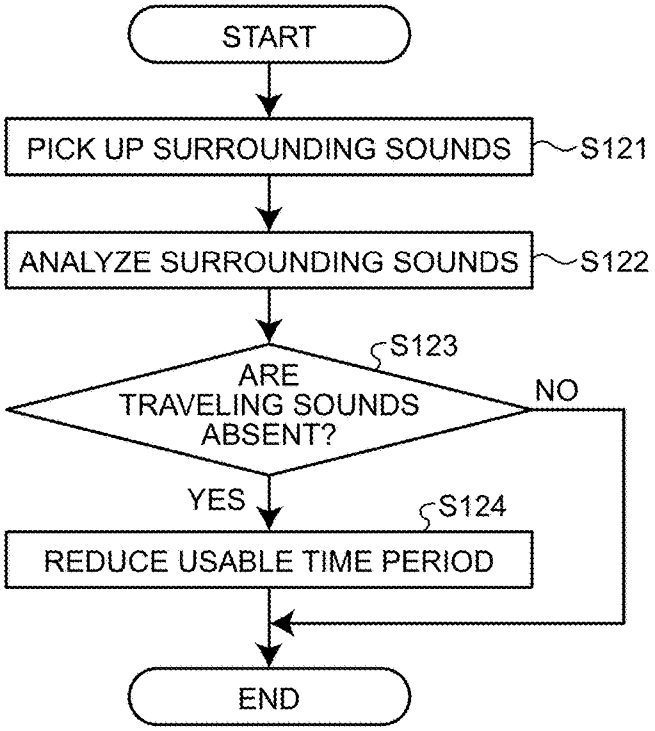
FIG. 6 is a flowchart illustrating a flow of a process at the communication control device, according to the second embodiment.

An onboard device 10A according to a second embodiment will now be described by reference to FIG. 4 to FIG. 6. FIG. 4 is a block diagram illustrating an example of a configuration of the onboard device 10A having a control unit 20A, according to the second embodiment. FIG. 5 is a diagram illustrating an example of traveling sounds. FIG. 6 is a flowchart illustrating a flow of a process at the control unit 20A according to the second embodiment. The onboard device 10A has a basic configuration similar to that of the onboard device 10 according to the first embodiment. In the following description, any component that is similar to that of the onboard device 10 will be assigned with the same reference sign or a corresponding reference sign, and detailed description thereof will be omitted. The onboard device 10A is different from that of the first embodiment in that the onboard device 10A has an analysis unit 27A and in processing at a wide area communication control unit 282A.

Sounds generated in a vehicle when the vehicle is traveling, for example, an engine sound, a muffled sound, a road surface sound, and a wind sound are noted in a case where a stop or traveling of the vehicle is analyzed.

Traveling sounds audible in the vehicle while the vehicle is traveling will be described by use of FIG. 5. The traveling sounds include four basic elements having different frequency bands. The four basic elements are an engine sound, a muffled sound, a road surface sound, and a wind sound. The traveling sounds include plural internal and external sounds that are a so-called superposition of noises. The engine sound has a fundamental frequency that is a half order component of an engine speed. The engine sound has a frequency band of 5 kHz or lower. The muffled sound is a low frequency sound that is ear-oppressing. The muffled sound has a frequency band of 20 Hz or higher and 250 Hz or lower. The road surface sound is a sound from a road surface and is a random sound generated by the road surface and the tires. The road surface sound has a frequency band of 1 kHz or lower. The wind sound is a random sound generated by disturbance of air currents around the vehicle. The wind sound has a frequency band of 500 Hz or higher and 5000 Hz or lower.

The analysis unit 27A makes an analysis of the traveling sounds of the vehicle audible in the vehicle at predetermined time intervals while the onboard device 10A is operating. The analysis unit 27A makes an analysis of whether the traveling sounds are present or absent, from surrounding sounds picked up by the microphone 15. Furthermore, the analysis unit 27A may make an analysis of the engine sound, the muffled sound, the road surface sound, and the wind sound, which are the four basic elements, from frequency bands of the surrounding sounds, for example.

The analysis unit 27A is able to determine a stop or traveling of the vehicle, from the presence or absence of the traveling sounds included in the surrounding sounds picked up by the microphone 15. More particularly, the analysis unit 27A determines that the vehicle is traveling in a case where the analysis unit 27A has determined that the traveling sounds are present. The analysis unit 27A determines that the vehicle has stopped in a case where the analysis unit 27A has determined that the traveling sounds are absent.

In a case where a result of the analysis by the analysis unit 27A indicates that the traveling sounds are absent, the wide area communication control unit 282A restricts communication by the wide area communication unit 182. When the vehicle is determined to be traveling, the wide area communication control unit 282A does not restrict the communication. When the vehicle is determined to be traveling, the wide area communication control unit 282A according to this embodiment does not restrict a usable time period of the wireless communication function of the wireless LAN router. When the vehicle is determined to have stopped, the wide area communication control unit 282A restricts the communication. When the vehicle is determined to have stopped, the wide area communication control unit 282A according to this embodiment provides a restriction to reduce the usable time period of the wireless communication function of the wireless LAN router to 30 minutes, for example. In a case where the usable time period of the wireless communication function has elapsed, the wide area communication control unit 282A performs control to restrict or stop the wireless communication function of the wireless LAN router.

The flow of the process at the control unit 20A will be described next by use of FIG. 6. The process in FIG. 6 is started under any condition. For example, the process is executed at predetermined time intervals, such as five-minute intervals, while communication is possible upon execution of the process in FIG. 3.

The control unit 20A picks up surrounding sounds (Step S121). More particularly, the control unit 20A acquires, by means of the sound acquisition unit 25, surrounding sounds picked up by the microphone 15 when the start-up sound is output from the speaker 14 at predetermined time intervals. The control unit 20A then proceeds to Step S112.

The control unit 20A makes an analysis of the surrounding sounds (Step S122). More particularly, by means of the analysis unit 27A, the control unit 20A makes an analysis of an engine sound, a muffled sound, a road surface sound, and a wind sound, which are the four basic elements, from frequency bands of the surrounding sounds, for example. By means of the analysis unit 27A, the control unit 20A makes a determination on whether the vehicle has stopped or is traveling. The control unit 20A then proceeds to Step S123.

The control unit 20A makes a determination on whether or not the traveling sounds are absent (Step S123). More particularly, by means of the analysis unit 27A, the control unit 20A is able to make a determination on whether the vehicle has stopped or is traveling, from the presence or absence of the traveling sounds. The control unit 20A determines that the vehicle has stopped in a case where the analysis unit 27A has determined that the traveling sounds are absent. The control unit 20A determines that the vehicle is traveling in a case where the analysis unit 27A has determined that the traveling sounds are present. In a case where the analysis unit 27A has determined that the traveling sounds are absent (Yes at Step S123), the control unit 20A proceeds to Step S124. In a case where the analysis unit 27A has determined that the traveling sounds are not absent (No at Step S123), the control unit 20A ends the process.

When it is determined that the traveling sounds are absent (Yes at Step S123), the usable time period for the communication is reduced (Step S124). More particularly, the control unit 20A reduces, by means of the wide area communication control unit 282A, the usable time period for the communication to and from an external device by the wide area communication unit 182 to, for example, 30 minutes. In other words, by means of the wide area communication control unit 282A, the control unit 20A performs control to restrict the usable time period of the wireless communication function of the wireless LAN router. In a case where the usable time period for the wireless communication function has elapsed, the control unit 20A performs control, by means of the wide area communication control unit 282A, to restrict or stop the wireless communication function of the wireless LAN router.

As described above, in this embodiment, in a case where a result of the analysis by the analysis unit 27A that analyzes the traveling sounds of the vehicle audible in the vehicle indicates that the traveling sounds are absent, the communication by the wide area communication unit 182 is restricted. This embodiment enables restriction of the communication when the vehicle has stopped. This embodiment enables prevention of use of a communication network for wide area wireless communication via the onboard device 10A by a portable information terminal in a case where the onboard device 10A has been taken out of the vehicle.

The onboard devices according to the present disclosure have been described thus far, but implementation in various different modes other than the above described embodiments is possible.

Each component of the onboard devices has been functionally and/or conceptually illustrated in the drawings, and is not necessarily configured physically as illustrated in the drawings. That is, the specific form of each device is not limited to the one illustrated in the drawings, and all or a part of each device may be functionally or physically separated or integrated in any units according to, for example, the processing load on the device and the use situation of the device.

Configurations of the onboard devices are implemented as software, by programs loaded into a memory, for example. With respect to the embodiments, functional blocks implemented by cooperation among these pieces of hardware or pieces of software have been described above. That is, these functional blocks may be implemented in any of various forms, by hardware only, software only, or a combination of hardware and software.

The above described components include those that are easily expected by persons skilled in the art, and those that are substantially the same. Furthermore, the above described configurations may be combined as appropriate. In addition, without departing from the gist of the present invention, various omissions, substitutions, or modifications of the configurations are possible.

The reference surrounding sound storage unit 16 described above may store acoustic features of the reference surrounding sounds. In this case, after acquisition of the reference surrounding sounds, the acoustic features of the reference surrounding sounds are analyzed and stored.

The wireless communication function of the onboard device 10 serving as the wireless LAN router may be a communication device separately bodied from the onboard device 10. The separately bodied communication device has the functions of the short range communication unit 181, the wide area communication unit 182, the short range communication control unit 281, and the wide area communication control unit 282. The onboard device 10 and the separately bodied communication device are able to communicate with each other by short range communication.

The onboard device 10 described above may be without the function to perform short range wireless communication. In this case, the onboard device 10 does not have the wireless communication function of the wireless LAN router. Communication by the onboard device 10 is disabled when the onboard device 10 has been taken out of the vehicle.

According to the above description, the communication control unit 28 controls the wide area communication unit 182 when the onboard device 10 has been taken out of the vehicle, but the communication control unit 28 may control the short range communication unit 181 instead. More particularly, when it is determined that there is no difference between the reference surrounding sounds and the surrounding sounds from a result of the comparison by the comparison unit 26, the short range communication control unit 281 brings the communication between the portable information terminal and the onboard device 10 via the short range communication unit 181 into the first state and when it is determined that there is a difference between the reference surrounding sounds and the surrounding sounds, the short range communication control unit 281 brings the communication between the portable information terminal and the onboard device 10 via the short range communication unit 181 into the second state. In this embodiment, when it is determined that there is no difference between the reference surrounding sounds and the surrounding sounds from a result of the comparison by the comparison unit 26, the short range communication control unit 281 enables the communication between the portable information terminal and the onboard device 10 via the short range communication unit 181 and when it is determined that there is a difference between the reference surrounding sounds and the surrounding sounds, the short range communication control unit 281 disables the communication between the portable information terminal and the onboard device 10 via the short range communication unit 181. In a case where the onboard device 10 has been taken out of the vehicle, use of the communication network for the wide area wireless communication via the onboard device 10 by the portable information terminal is thereby able to be prevented also.

The communication control unit 28 may control the wide area communication unit 182 and the short range communication unit 181 when the onboard device 10 has been taken out of the vehicle.

Upon a comparison between the acoustic features by the comparison unit 26 described above, whether or not a change in any object that has a possibility of changing is present or absent in the vehicle may be determined. In this case, the reference surrounding sound storage unit 16 recognizes any object having a possibility of changing, from a video of the interior of the vehicle shot by a camera in the vehicle and stores information on that object, together with the acoustic features of the reference surrounding sounds, the camera not being illustrated in the drawings. Whether or not there is a difference between a recognition result for the object having the possibility of changing and recognized from a video of the interior of the vehicle shot by the camera in the vehicle and the information on the object having the possibility of changing and stored in the reference surrounding sound storage unit 16 is determined upon a comparison between the acoustic features. If there is no difference, it is determined that the sound pickup conditions are the same. If there is a difference, it is determined that the sound pickup conditions are different. The comparison unit 26 may then make a comparison between the acoustic features in consideration of the difference between the sound pickup conditions.

The present disclosure may be used, for example, for a drive recorder, a navigation device, or a wireless communication device for vehicles, which has been installed in a vehicle.

An effect provided according to the present disclosure enables adequate control of a communication function of an onboard device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication control device, comprising:

a sound acquisition unit configured to acquire surrounding sounds including at least a specific sound and picked up by a sound pickup unit upon output of the specific sound from a sound output unit;

a comparison unit configured to make an analysis of and a comparison between acoustic features of reference surrounding sounds that are surrounding sounds picked up by the sound pickup unit upon output of the specific sound from the sound output unit at a time of initial setting and acoustic features of the surrounding sounds acquired by the sound acquisition unit at a time other than the time of initial setting; and a communication control configured to, in response to determining that there is no difference between the reference surrounding sounds and the acquired surrounding sounds from a result of the comparison by the comparison unit, bring communication to and from an external device by wide area wireless communication or communication to and from a portable information terminal by short range wireless communication into a first state, and in response to determining that there is a difference between the reference surrounding sounds and the surrounding sounds from the result of the comparison by the comparison unit, bring the communication to and from the external device by the wide area wireless communication or the communication to and from the portable information terminal by the short range wireless communication into a second state more restricted than the first state.

2. The communication control device according to claim 1, wherein the first state is a state in which communication is enabled, and the second state is at least one of a state in which communication is disabled, a state in which a usable time period is restricted, or a state in which a communication volume is restricted.

3. The communication control device according to claim 1, further comprising:

an analysis unit configured to make an analysis of traveling sounds of a vehicle, the traveling sounds being audible in the vehicle, wherein the communication control unit is configured to restrict communication when a result of the analysis by the analysis unit indicates that the traveling sounds are absent.

4. An onboard device, comprising:

the communication control device according to claim 1; and a sound pickup unit that picks up sound, wherein the sound pickup unit is installed to face a direction where there are a small number of or no objects that have a possibility of changing in a space between the sound output unit and the sound pickup unit when an echo of a sound output from the sound output unit is picked up by the sound pickup unit.

5. The onboard device according to claim 4, further comprising:

the sound output unit configured to output a sound, wherein the sound output unit is installed to face the direction where there are a small number of or no objects that have a possibility of changing in the space between the sound output unit and the sound pickup unit when an echo of a sound output from the sound output unit is picked up by the sound pickup unit.

* * * * *